UNITED STATES PATENT OFFICE.

GEORGE F. KREISCHER AND LUCIEN A. TARTIERÈ, OF NEW YORK, N. Y.

IMPROVEMENT IN COMPOUNDS FOR GAS-RETORTS.

Specification forming part of Letters Patent No. 137,934, dated April 15, 1873; application filed March 28, 1873.

*To all whom it may concern:*

Be it known that we, GEORGE F. KREISCHER and LUCIEN A. TARTIERÈ, both of the city, county, and State of New York, have invented a new and Improved Compound for Gas-Retorts and other purposes; and we do hereby declare the following to be a full, clear, and exact description thereof, which will enable those skilled in the art to make and use the same.

This invention relates to a compound made of ground fire-brick, clay, Teil hydraulic lime, and carbon, which ingredients, when mixed together as hereinafter described, produce a mixture particularly suited for gas-retorts or other articles which have to stand great changes of temperature.

In preparing our compound we take the above-named ingredients in about the following proportions: Ground fire-brick, two hundred parts; clay, three hundred parts; Teil hydraulic lime, seventy-five parts; carbon, seventy-five parts.

The Teil hydraulic lime which we use consists of—

| | |
|---|---:|
| Lime | 78.29 |
| Silica | 18.20 |
| Alumina | 1.80 |
| Quartz-sand | 1.71 |
| | 100.00 |

The several ingredients are ground and mixed together in a dry state, and then sufficient water is added to produce a plastic mass which can be readily brought in the desired shape by molds or other means generally used for such purposes.

By combining these ingredients in the proportions above specified, we have succeeded to produce a composition which can be used with great advantage for gas-retorts, and we have subjected such retorts to the most severe tests by heating them to a white heat and then plunging them in cold water without producing any injury to the retorts.

It is obvious, however, that our compound may be used for various articles which may be exposed to great changes in temperature.

What we claim as new, and desire to secure by Letters Patent, is—

A compound made of the ingredients herein described, and mixed together substantially as and about in the proportion herein set forth.

GEO. F. KREISCHER.
LUCIEN A. TARTIERÈ.

Witnesses:
W. HAUFF,
E. F. KASTENHUBER.